(12) United States Patent
Ding et al.

(10) Patent No.: US 10,997,966 B2
(45) Date of Patent: May 4, 2021

(54) VOICE RECOGNITION METHOD, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Ke Ding, Beijing (CN); Bing Jiang, Beijing (CN); Xiangang Li, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 220 days.

(21) Appl. No.: 16/319,335

(22) PCT Filed: Jan. 25, 2017

(86) PCT No.: PCT/CN2017/072641
§ 371 (c)(1),
(2) Date: Jan. 19, 2019

(87) PCT Pub. No.: WO2018/014537
PCT Pub. Date: Jan. 25, 2018

(65) Prior Publication Data
US 2019/0287514 A1 Sep. 19, 2019

(30) Foreign Application Priority Data
Jul. 22, 2016 (CN) .......................... 201610586698.9

(51) Int. Cl.
*G10L 15/02* (2006.01)
*G10L 15/14* (2006.01)
(Continued)

(52) U.S. Cl.
CPC .............. *G10L 15/02* (2013.01); *G10L 15/06* (2013.01); *G10L 15/14* (2013.01); *G10L 15/16* (2013.01); *G10L 15/063* (2013.01)

(58) Field of Classification Search
None
See application file for complete search history.

(56) References Cited

U.S. PATENT DOCUMENTS 5,839,103 A * 11/1998 Mammone .............. G10L 17/20
704/232
8,856,049 B2 * 10/2014 Vasilache ................ G10L 25/78
706/12

(Continued)

FOREIGN PATENT DOCUMENTS

| JP | H01204099 A | 8/1989 |
| JP | 2015102806 A | 6/2015 |

OTHER PUBLICATIONS

Courbariaux (Courbariaux, et al. "Binarized neural networks: Training neural networks with weights and activations constrained to+ 1 or−1." arXiv preprint arXiv: 1602.02830 (2016).) (Year: 2016).*

(Continued)

*Primary Examiner* — Jonathan C Kim
(74) *Attorney, Agent, or Firm* — Lathrop GPM LLP

(57) ABSTRACT

Disclosed are a speech recognition method, a device and a computer readable storage medium. The speech recognition method comprises: performing acoustic characteristic extraction on an input voice, so as to obtain an acoustic characteristic (S11); acquiring an acoustic model, a parameter of the acoustic model being a binarization parameter (S12); and according to the acoustic characteristic and the acoustic model, performing speech recognition (S13).

17 Claims, 2 Drawing Sheets

(51) Int. Cl.
    *G10L 15/16* (2006.01)
    *G10L 15/06* (2013.01)

(56) References Cited

U.S. PATENT DOCUMENTS

| | | | | |
|---|---|---|---|---|
| 8,972,253 | B2* | 3/2015 | Deng | G10L 15/14 704/231 |
| 9,099,083 | B2* | 8/2015 | Deng | G10L 15/063 |
| 10,170,110 | B2* | 1/2019 | Zhou | G10L 15/063 |
| 10,210,860 | B1* | 2/2019 | Ward | G10L 15/30 |
| 10,229,356 | B1* | 3/2019 | Liu | G06N 3/084 |
| 10,380,997 | B1* | 8/2019 | Ward | G06K 9/4628 |
| 10,930,269 | B2* | 2/2021 | Guevara | G06N 3/08 |
| 2012/0065976 | A1* | 3/2012 | Deng | G10L 15/14 704/256.1 |
| 2014/0149112 | A1* | 5/2014 | Kalinli-Akbacak | G10L 15/04 704/232 |
| 2015/0161993 | A1* | 6/2015 | Sainath | G10L 15/07 704/237 |
| 2015/0170020 | A1* | 6/2015 | Garimella | G06N 3/082 706/14 |
| 2018/0350351 | A1* | 12/2018 | Kopys | G10L 15/02 |
| 2019/0147856 | A1* | 5/2019 | Price | G06N 3/063 704/232 |
| 2019/0287514 | A1* | 9/2019 | Ding | G10L 15/14 |

OTHER PUBLICATIONS

Lin Z, Courbariaux M, Memisevic R, Bengio Y. Neural networks with few multiplications. arXiv preprint arXiv:1510.03009. Oct. 11, 2015. (Year: 2015).*

Li J, Mohamed A, Zweig G, Gong Y. LSTM time and frequency recurrence for automatic speech recognition. In2015 IEEE workshop on automatic speech recognition and understanding (ASRU) Dec. 13, 2015 (pp. 187-191). IEEE. (Year: 2015).*

Maas AL, Hannun AY, Ng AY. Rectifier nonlinearities improve neural network acoustic models. InProc, icml Jun. 1, 20136 (vol. 30, No. 1, p. 3). (Year: 2013).*

Takeda R, Komatani K, Nakadai K. Acoustic model training based on node-wise weight boundary model increasing speed of discrete neural networks. In2015 IEEE Workshop on Automatic Speech Recognition and Understanding (ASRU) Dec. 13, 2015 (pp. 52-58). IEEE. (Year: 2015).*

Badino (Badino, Leonardo, Alessio Mereta, and Lorenzo Rosasco. "Discovering discrete subword units with binarized autoencoders and hidden-Markov-model encoders." Sixteenth Annual Conference of the International Speech Communication Association. 2015.) (Year: 2015).*

Xing (Xing, Anhao, Qingwei Zhao, and Yonghong Yan. "Speeding up deep neural networks in speech recognition with piecewise quantized sigmoidal activation function." IEICE Transactions on Information and Systems 99.10 (2016): 2558-2561.; Manuscript publicized Jul. 19, 2016.) (Year: 2016).*

Japanese Patent Application No. P2019-501963 Office Action dated Mar. 24, 2020, 3 pages.

Japanese Patent Application No. P2019-501963 English translation of Office Action dated Mar. 24, 2020, 3 pages.

Haode, G. et al.; Research in Extraction for the Ship-Bridge Speech Recognition Experiment System, 1982, 13 pages.

Chinese Patent Application No. 201610586698.9 First Office Action dated Oct. 29, 2018, 6 pages.

Chinese Patent Application No. 201610586698.9 English translation of First Office Action dated Oct. 29, 2018, 5 pages.

PCT/CN2017/072641 International Search Report and Written Opinion dated May 4, 2017, 12 pages.

PCT/CN2017/072641 English translation of International Search Report dated May 4, 2017, 2 pages.

* cited by examiner

VOICE RECOGNITION METHOD, DEVICE AND COMPUTER STORAGE MEDIUM

CROSS-REFERENCE TO RELATED APPLICATIONS

This application is the US national phase of International Application No. PCT/CN2017/072641, which is based on and claims priority of Chinese Patent Application No. 201610586698.9, filed on Jul. 22, 2016 by BAIDU ONLINE NETWORK TECHNOLOGY (BEIJING) CO., LTD., entitled "Voice recognition method and apparatus", the entire contents of which are incorporated herein by reference.

FIELD

The present disclosure relates to the field of speech processing technology, and more particularly to a speech recognition method, a device and a computer readable storage medium.

BACKGROUND

With the increasing popularity of mobile devices such as smart phones and tablet computers, speech, as a means of natural human-machine interaction, plays an increasingly important role in daily work of people. Speech recognition is configured to recognize the speech as text.

Speech recognition may be divided into network speech recognition and embedded speech recognition. The network speech recognition refers to that a user uploads a speech signal to a server via network, and the speech recognition is performed by the server, and then a recognition result is returned to the user. The embedded speech recognition refers to that the speech recognition is performed by the user through a speech recognizer embedded in a smart terminal.

A key part of the speech recognition is an acoustic model. The acoustic model generated at present is relatively large. Therefore, the acoustic model used by the server may not be applied to the smart terminal directly, and a solution applying for the embedded speech recognition needs to be given.

SUMMARY

The present disclosure aims to solve one of the technical problems in the related art to at least some extent.

Therefore, a first objective of the present disclosure is to provide a speech recognition method.

Another objective of the present disclosure is to provide a speech recognition apparatus.

To achieve the above objectives, a first aspect of embodiments of the present disclosure provides a speech recognition method, including: performing acoustic characteristic extraction on an input speech, to obtain an acoustic characteristic; obtaining an acoustic model, in which, a parameter of the acoustic model is a binarization parameter; and performing speech recognition according to the acoustic characteristic and the acoustic model.

To achieve the above objectives, a second aspect of embodiments of the present disclosure provides a speech recognition apparatus, including a characteristic extraction module, an obtaining module and a recognition module. The characteristic extraction module is configured to perform acoustic characteristic extraction on an input speech, to obtain an acoustic characteristic. The obtaining module is configured to obtain an acoustic model, in which a parameter of the acoustic model is a binarization parameter. The recognition module is configured to perform speech recognition according to the acoustic characteristic and the acoustic model.

Embodiments of the present disclosure further provide a device, including: a processor and a memory. The memory is configured to store instructions executable by the processor; in which, the processor is configured to execute: the method according to any of the first aspect of embodiments of the present disclosure.

Embodiments of the present disclosure further provide a non-temporary computer readable storage medium. When instructions in the storage medium are executed by a processor, the processor is configured to execute: the method according to any of the first aspect of embodiments of the present disclosure.

Embodiments of the present disclosure further provide a computer program product. When instructions in the computer program product are executed by a processor, the processor is configured to execute: the method according to any of the first aspect of embodiments of the present disclosure.

Additional aspects and advantages of embodiments of the present disclosure will be given in part in the following descriptions, and become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
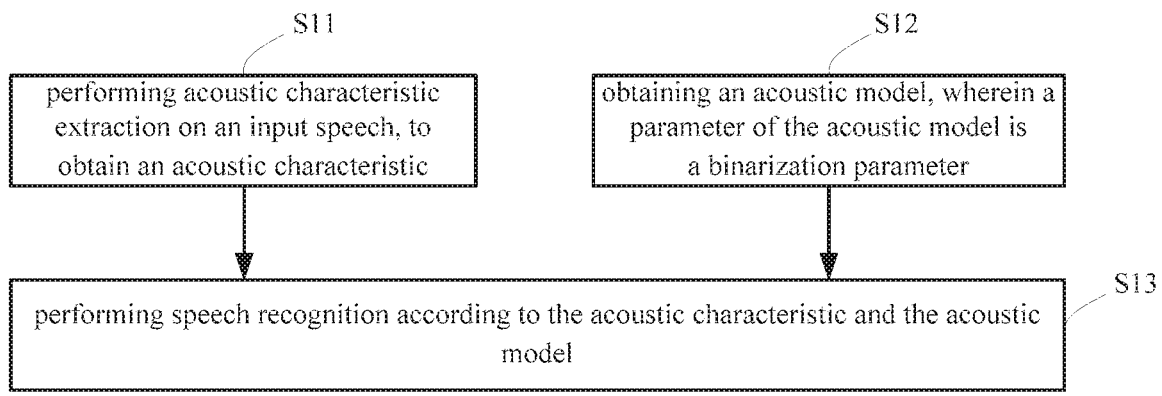
FIG. 1 is a flow chart illustrating a speech recognition method provided in an embodiment of the present disclosure.

Description will be made in detail below to embodiments of the present disclosure. Examples of embodiments are illustrated in the accompanying drawings, in which, the same or similar numbers represent the same or similar elements or elements with the same or similar functions. Embodiments described below with reference to the accompanying drawings are exemplary, which are intended to explain the present disclosure and do not be understood a limitation of the present disclosure. On the contrary, embodiments of the present disclosure include all variations, modifications and equivalents falling within the spirit of accompanying claims and scope of the connotation.

The present disclosure will be described by taking embedded speech recognition as examples. However, it should be understood that, the method provided in embodiments is not limited to the embedded speech recognition, and may further be applicable to network speech recognition, that is, a server may employ the following solutions.

Compared with the server, storage space, calculating ability and resources of a smart terminal are relatively poor, therefore an acoustic model employed by the server may not be directly applied to the embedded speech recognition.

To apply to the embedded speech recognition, the size of the acoustic model needs to be reduced.

At present, a hybrid modeling of a DNN (Deep Neural Network) and an HMM (Hidden Markov Model) is usually used to generate the acoustic model.

To reduce the size of the acoustic model efficiently, the present disclosure is mainly based on the following ideas: a parameter of the acoustic model is changed from a floating point representation to a binarization representation. Further, when an acoustic characteristic passes through the DNN, an output parameter of the acoustic characteristic is further changed to the binarization representation.

It should be noted that, although the main ideas of the present disclosure have been illustrated above, detailed technical solutions are not limited to the foregoing ideas, instead, other characteristics can be combined. Combinations of those different technical characteristics also fall within a protection scope of the present disclosure.

It should be noted that, although the main technical problems have been given above, the present disclosure is not limited to solving the foregoing technical problems only. Other technical problems that may be solved by applying the technical solution provided in this application shall fall within the protection scope of this present disclosure.

It should be noted that, each embodiment of the present disclosure is not limited to solving all technical problems preferably, and to solving at least one technical problem to at least some extent.

It should be noted that, although the main ideas of the present disclosure have been given above, and the following embodiments will illustrate special details, an innovation point of the present disclosure is not limited to the foregoing main ideas and contents referred by the special details and it is not excluded that some contents that are not specifically illustrated in the present disclosure may still include the innovation point of the present disclosure.

It should be understood that, although some illustrations have been made above, other possible solutions should not be excluded. Therefore, the technical solutions which are the same, similar and equivalent with the following embodiments provided by the present disclosure also fall within the protection scope of this present disclosure.

Illustration will be made to the technical solutions of the present disclosure with reference to detailed embodiments.

A smart terminal referred in the present disclosure may include various terminals that enable to employ the speech recognition technology, such as a smart phone, a table computer, a smart wearable device, a vehicle terminal, a smart robot, a smart home appliance.

FIG. 1 is a flow chart illustrating a speech recognition method provided in an embodiment of the present disclosure.

As illustrated in FIG. 1, in this embodiment, the method includes the followings.

In block S11: acoustic characteristic extraction is performed on an input speech, to obtain an acoustic characteristic.

The acoustic characteristic extraction may be performed by employing present or future acoustic characteristic extraction processes. For example, the acoustic characteristic includes a MFCC (Mel Frequency Cepstrum Coefficient) and the like.

In block S12: an acoustic model is obtained, in which, a parameter of the acoustic model is a binarization parameter.

The acoustic model may be generated in a training process, and the acoustic model generated by the training process may be obtained directly in a recognition process.

The parameter of an ordinary acoustic model is a floating point number, therefore, each parameter usually occupies 16 bits and 36 bits.

In embodiments, the parameter of the acoustic model is the binarization parameter, which means that each parameter is any one of two values which already are determined. For example, when the two values already determined are represented by +1 and −1, each parameter is +1 or −1.

Since the parameter of the acoustic model is the binarization parameter, each parameter may be represented by one bit. Compared to the situation in which each parameter occupies 16 bits or 32 bits, the size of the acoustic model may be reduced apparently, such that storage space needed is reduced.

In block S13: speech recognition is performed according to the acoustic characteristic and the acoustic model.

The acoustic model may indicate a relationship between speech and an acoustic state probability. Therefore, after obtaining the acoustic characteristic, the acoustic state probability may be obtained according to the acoustic model. It should be understood that, the speech recognition may further include other flows, for example, after obtaining an acoustic state probability, the speech may be transformed into text according to a language model, a phonetic dictionary and the like, so as to finish the final speech recognition. The present disclosure mainly illustrates related contents of the acoustic model, and other processes of the speech recognition may further be implemented by employing present or future technologies.

In embodiments, by employing the acoustic model of which the parameter is the binarization parameter, the size of the acoustic model may be decreased apparently and storage space needed is reduced, such that the method may be applicable to the embedded speech recognition.

A technical solution that relatively solves more comprehensive problems will be given below. However, the present disclosure is not limited to the solutions of embodiments, and further technical characteristics solving different technical problems separately can be combined into new technical solutions, or, different technical characteristics can be combined in different ways to obtain new technical solutions.

Figure 2:
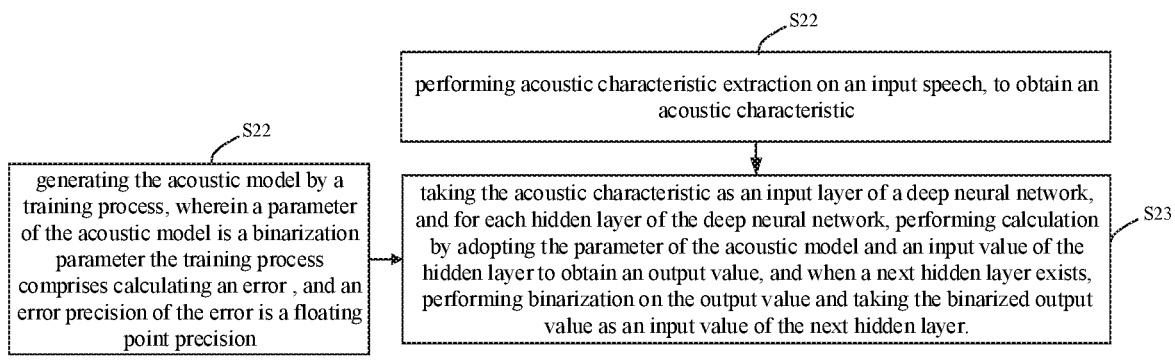
FIG. 2 is a flow chart illustrating a speech recognition method provided in another embodiment of the present disclosure.

FIG. 2 is a flow chart illustrating a speech recognition method provided in another embodiment of the present disclosure.

As illustrated in FIG. 2, the method of embodiments includes the following blocks.

In block S21, an acoustic model is generated by a training process, in which, a parameter of the acoustic model is a binarization parameter, and the training process includes calculating an error and an error precision of the error is a floating point precision.

A plurality of speech samples may be collected in the training process, and an acoustic characteristic is extracted for each speech sample, and then the training process is performed according to those acoustic characteristics to generate the acoustic model.

When the acoustic model is trained, a plurality of ways may be employed. In other embodiments, the acoustic model may be generated by the training process with a hybrid modeling of DNN and HMM.

Different from an original hybrid modeling of DNN and HMM, in embodiments, the parameter of the acoustic model employs the binarization parameter.

An error back propagation method may be employed when the error is calculated above. The error back propagation method includes: output error (a certain form)→a hidden layer (layer by layer)→an input layer. The main objective is to distribute the error to all units of each layer by back propagating the output error, such that an error signal of each unit of each layer is obtained, and thus a weight of each unit is corrected (the processing is a process of adjusting the weight).

Further, to ensure a precision, the parameter of the acoustic model employed is the binarization parameter when the error is calculated, however, the error precision of the error employs the floating point precision. For example, other values except the parameter of the acoustic model are floating point numbers when the error is calculated.

The foregoing block S21 may be finished in the training process, and the acoustic model obtained may be applied in the following speech recognition.

The speech recognition process may perform the followings.

In block S22: acoustic characteristic extraction is performed on an input speech, to obtain the acoustic characteristic.

The block may refer to related contents of the foregoing embodiment, which is not illustrated in detail herein.

In block S23: the acoustic characteristic is taken as an input layer of a DNN, and for each hidden layer of the DNN, calculation is performed by employing the parameter of the acoustic model and an input value of the hidden layer to obtain an output value, when a next hidden layer exists, binarization is performed on the output value and the binarized output value is taken as an input value of the next hidden layer.

To ensure the binarization operation during the entire process, not only the parameter of acoustic model employs the binarization value, but also other referred parameters further may employ the binarization values.

In the foregoing process, the binarization may further be performed on the acoustic characteristic, such that the input value of the first hidden layer connected to the input layer is also the binarization value.

Further, to ensure a stability of the acoustic model, before performing the binarization on the output value, linear transformation may be performed firstly. A formula of the linear transformation may be illustrated as formula (1).

$$Y=a*X+b \qquad (1)$$

X represents an original value of the output value. Y is a linear transformed output value. a and b are two fixed parameters, which may be preset.

Figure 3:
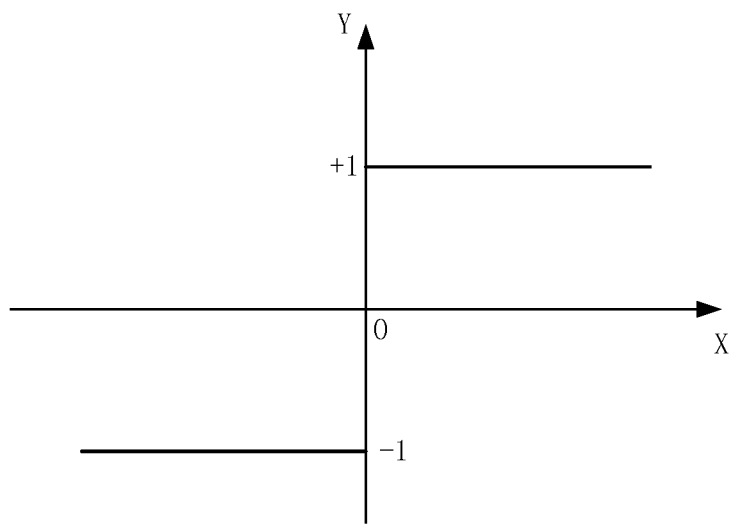
FIG. 3 is a schematic diagram illustrating an activation function of binarization in embodiments of the present disclosure.

Further, when the binarization is performed on data, a binarization activation function may be employed. For example, the binarization activation function is illustrated in FIG. 3. Based on the activation function illustrated in FIG. 3, when an original value of data is greater than 0, a binarization value is +1. When an original value of data is lower than 0, a binarization value is −1.

In the above embodiments, the binarization value being +1 or −1 is taken as an example, and it should be understood that, the binarization value may be represented by other numbers, such as 1 or 0.

Figure 4:
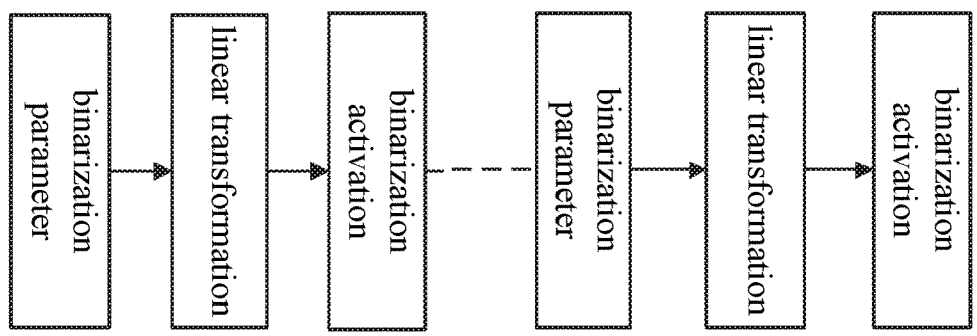
FIG. 4 is a schematic diagram illustrating a binarization network in embodiments of the present disclosure.

Therefore, with the binarization parameter, linear transformation and binarization activation function described above, a binarization network illustrated in FIG. 4 may be included when the speech recognition is performed.

Further, when operation is performed on the values, since the operation is performed on the binarization values, an ordinary matrix operation may be replaced by a bit operation.

In detail, an exclusive or operation may be used to replace multiplication operation and a number of occurrences for each binarization value may be used to replace add operation.

For example, a and b represent values of the two operations, and both a and b are binarization values. As illustrated in table 1, the multiplication operation of a and b (a*b) may be replaced by the exclusive or (XOR) operation. One value may be encoded to be 0 and the other value is encoded to be 1 when the exclusive or operation is performed, for example, +1 is encoded to be 0, and −1 is encoded to be 1. In addition, an accumulation operation may be realized by calculating the number of occurrences of "set" bit and the number of occurrences of "unset" bit. The "set" bit and the "unset" bit respectively represent one of the binarization values, for example, one is +1, and the other one is −1.

TABLE 1

| a  | b  | a*b |
|----|----|-----|
| +1 | +1 | +1  |
| +1 | −1 | −1  |
| −1 | +1 | −1  |
| −1 | −1 | +1  |

The foregoing processes may be implemented by employing special hardware or universal hardware, such as a CPU (Central Processing Unit), a GPU (Graphics Processing Unit).

In embodiments, by selecting the parameter of the acoustic model as the binarization parameter, a size of the acoustic model may be reduced, and storage space need is reduced. By selecting the error precision as the floating point precision in the training process, performance of the acoustic model may be ensured, such that performance of the speech recognition may be ensured. By employing the binarization value in the whole operation process and replacing a matrix operation into the bit operation in the operation process, an operation amount may be reduced, the need for calculation capability and resources may be reduced, and calculation capability of hardware such as DSP (Digital Signal Processor), FPGA (Field Programmable Gate Array) may be utilized sufficiently. Since operation complexity is reduced, the embodiments of the present disclosure may further be applicable to traditional hardware, such as the CPU and the GPU.

Figure 5:
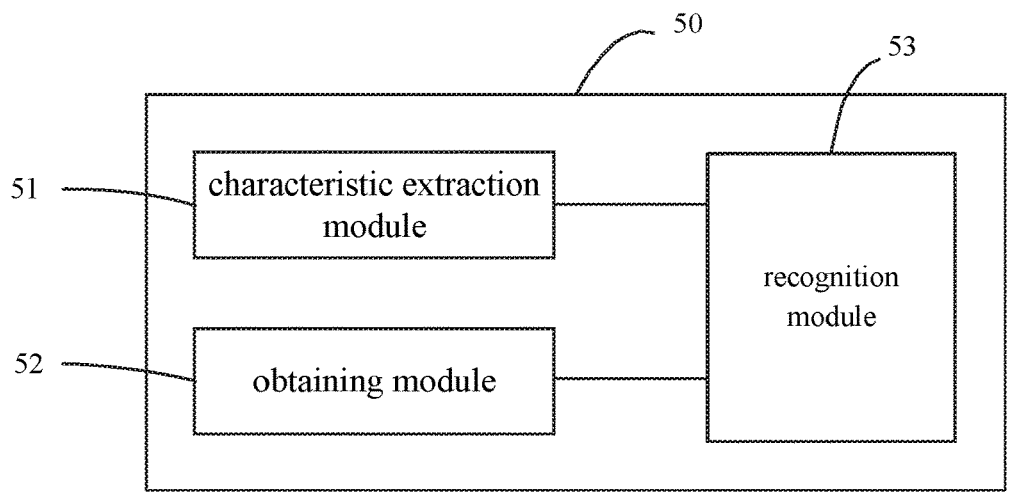
FIG. 5 is a block diagram illustrating a speech recognition apparatus provided in an embodiment of the present disclosure.

FIG. 5 is a block diagram illustrating a speech recognition apparatus provided in an embodiment of the present disclosure.

The apparatus in this embodiment may be located in an embedded speech recognition or be configured in a server.

As illustrated in FIG. 5, the apparatus 50 in this embodiment includes: a characteristic extraction module 51, an obtaining module 52 and a recognition module 53.

The characteristic extraction module 51 is configured to perform acoustic characteristic extraction on an input speech, to obtain an acoustic characteristic.

The obtaining module 52 is configured to obtain an acoustic model, in which, a parameter of the acoustic model is a binarization parameter.

The recognition module 53 is configured to perform speech recognition according to the acoustic characteristic and the acoustic model.

Figure 6:
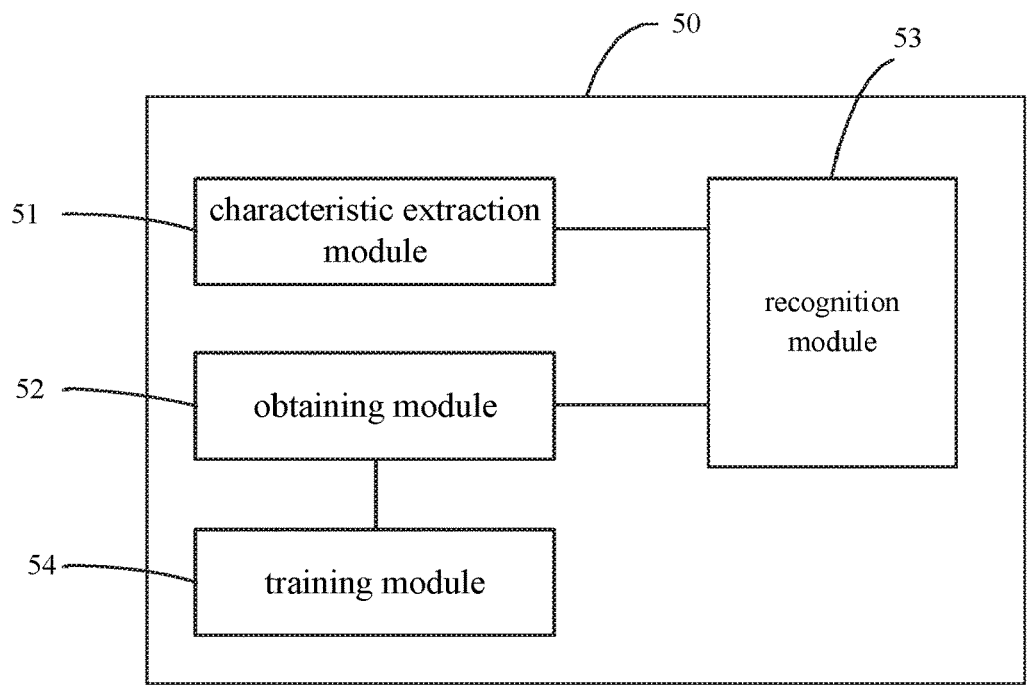
FIG. 6 is a block diagram illustrating a speech recognition apparatus provided in an embodiment of the present disclosure.

In some embodiments, referring to FIG. 6, the apparatus 50 in this embodiment further includes a training module 54.

The training module 54 is configured to generate the acoustic model by a training process, in which, the training process includes calculating an error by using an error back propagation method, and an error precision of the error is a floating point precision.

In some embodiments, the recognition module 53 is specifically configured to: take the acoustic characteristic as an input layer of a DNN when the acoustic model includes the DNN, and for each hidden layer of the DNN, perform calculation by employing the parameter of the acoustic model and an input value of the hidden layer to obtain an output value, and when a next hidden layer exists, perform binarization on the output value and take the binarized output value as an input value of the next hidden layer.

In some embodiments, the recognition module 53 is further configured to: perform linear transformation on the output value and perform binarization on the transformed output value.

In some embodiments, the recognition module 53 is configured to perform the calculation by employing the parameter of the acoustic model and the input value of the hidden layer to obtain the output value by: performing bit manipulation according to the parameter of the acoustic model and the input value of the hidden layer, to obtain the output value.

It should be understood that, the apparatus in embodiments corresponds to the foregoing method of embodiments, and detailed contents may refer to related descriptions of the method of embodiments, which are not illustrated in detail herein.

In embodiments, by employing the acoustic model of which the parameter is the binarization parameter, a size of the acoustic model may be decreased apparently and storage space needed is reduced, such that the method may be applicable to the embedded speech recognition.

It should be understood that, the same or similar contents in the foregoing embodiments may be referred to each other. Contents not described in detail in some embodiments may be referred to the same or similar contents in other embodiments.

The present disclosure further provides a device, including: a processor and a memory, and the memory is configured to store instructions executable by the processor; in which, the processor is configured to execute: performing acoustic characteristic extraction on an input speech, to obtain an acoustic characteristic; obtaining an acoustic model, in which, a parameter of the acoustic model is a binarization parameter; and performing speech recognition according to the acoustic characteristic and the acoustic model.

The present disclosure further provides a non-temporary computer readable storage medium. When instructions in the storage medium are executed by a processor, the processor is configured to execute: performing acoustic characteristic extraction on an input speech, to obtain an acoustic characteristic; obtaining an acoustic model, in which, a parameter of the acoustic model is a binarization parameter; and performing speech recognition according to the acoustic characteristic and the acoustic model.

The present disclosure further provides a computer program product. When instructions in the computer program product are executed by a processor, the processor is configured to execute: performing acoustic characteristic extraction on an input speech, to obtain an acoustic characteristic; obtaining an acoustic model, in which, a parameter of the acoustic model is a binarization parameter; and performing speech recognition according to the acoustic characteristic and the acoustic model.

It should be noted that, in description of the present disclosure, the terms "first", "second" is only for description purpose, and it cannot be understood as indicating or implying its relative importance. In addition, in the description of the present disclosure, "a plurality of" means at least two, unless specified otherwise.

Any procedure or method described in the flow charts or described in any other way herein may be understood including one or more modules, portions or parts for executing instruction codes that implement steps of a custom logic function or procedure. And preferable embodiments of the present disclosure includes other implementation, in which the order of execution is different from that which is depicted or discussed, including executing functions in a substantially simultaneous manner or in an opposite order according to the related functions, which may be understood by the skilled in the art of embodiments of the present disclosure.

It should be understood that, respective parts of the present disclosure may be implemented with hardware, software, firmware or a combination thereof. In the above implementations, a plurality of steps or methods may be implemented by software or firmware that is stored in the memory and executed by an appropriate instruction executing system. For example, if it is implemented by hardware, which is the same with another implementation, it may be implemented by any one of the following technologies known in the art or a combination thereof as in another embodiment: a discrete logic circuit(s) having logic gates for implementing logic functions upon data signals, an application specific integrated circuit having appropriate combinational logic gates, a programmable gate array(s) (PGA), a field programmable gate Array (FPGA), etc.

The ordinary skilled in the art may understand that all or some steps in the above embodiments may be completed by the means that relevant hardware is instructed by a program. The program may be stored in a computer readable storage medium, and the program includes any one or combination of the steps in embodiments when being executed.

In addition, respective function units in respective embodiments of the present disclosure may be integrated in a processing unit, and respective unit may further exist physically alone, and two or more units may further be integrated in a unit. The foregoing integrated unit may be implemented either in the forms of hardware or software. If the integrated module is implemented as a software functional module and is sold or used as a stand-alone product, it may be stored in a computer readable storage medium.

The above-mentioned storage medium may be a read only memory, a magnetic disk or a disk and the like.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described above, it should be understood that, the above embodiments are exemplary, and it would be appreciated by those skilled in the art that the above embodiments cannot be construed to limit the present disclosure, and changes, alternatives, and modifications can be made in the embodiments without departing from scope of the present disclosure.

What is claimed is:

1. A speech recognition method, comprising:
performing acoustic characteristic extraction on an input speech, to obtain an acoustic characteristic;
obtaining an acoustic model, wherein a parameter of the acoustic model is a binarization parameter; and
performing speech recognition according to the acoustic characteristic and the acoustic model;
wherein, performing the speech recognition according to the acoustic characteristic and the acoustic model, comprises:
performing binarization on the acoustic characteristic;
taking the binarized acoustic characteristic as an input layer of a deep neural network when the acoustic model comprises the deep neural network; and
for each hidden layer of the deep neural network, performing calculation by employing the parameter of the acoustic model and an input value of the hidden layer to obtain an output value, and when a next hidden layer exists, performing binarization on the output value to obtain a binarized output value and taking the binarized output value as an input value of the next hidden layer.

2. The method according to claim 1, further comprising:
generating the acoustic model by a training process, wherein the training process comprises calculating an error by using an error back propagation method, and an error precision of the error is a floating point precision.

3. The method according to claim 1, further comprising:
performing linear transformation on the output value to obtain a transformed output value and performing binarization on the transformed output value.

4. The method according to claim 3, wherein, the linear transformation is performed by a formula of: Y=a*X+b; where X represents an original value of the output value, Y is a linear transformed output value, a and b are two fixed parameters.

5. The method according to claim 1, wherein, performing the calculation by employing the parameter of the acoustic model and the input value of the hidden layer to obtain the output value, comprises:
performing bit manipulation according to the parameter of the acoustic model and the input value of the hidden layer, to obtain the output value.

6. The method according to claim 1, wherein the acoustic characteristic comprises a mel frequency cepstrum coefficient.

7. The method according to claim 1, wherein the binarization parameter occupies one bit.

8. The method according to claim 1, wherein, performing the binarization on the output value to obtain the binarized output value comprises:
when the output value is greater than 0, determining the binarized output value as a first binarization value; and
when the output value is not greater than 0, determining binarized output value as a second binarization value different from the first value.

9. A device, comprising:
a processor;
a memory, configured to store instructions executable by the processor; wherein the processor is configured to execute:
performing acoustic characteristic extraction on an input speech, to obtain an acoustic characteristic;
obtaining an acoustic model, wherein a parameter of the acoustic model is a binarization parameter; and
performing speech recognition according to the acoustic characteristic and the acoustic model;
wherein, performing the speech recognition according to the acoustic characteristic and the acoustic model, comprises:
performing binarization on the acoustic characteristic;
taking the binarized acoustic characteristic as an input layer of a deep neural network when the acoustic model comprises the deep neural network; and
for each hidden layer of the deep neural network, performing calculation by employing the parameter of the acoustic model and an input value of the hidden layer to obtain an output value, and when a next hidden layer exists, performing binarization on the output value to obtain a binarized output value and taking the binarized output value as an input value of the next hidden layer.

10. The device according to claim 9, wherein the processor is further configured to perform an act of:
generating the acoustic model by a training process, wherein the training process comprises calculating an error by using an error back propagation method, and an error precision of the error is a floating point precision.

11. The device according to claim 9, wherein the processor is further configured to perform acts of:
performing linear transformation on the output value to obtain a transformed output value and performing binarization on the transformed output value.

12. The device according to claim 11, wherein, the linear transformation is performed by a formula of: Y=a*X+b; where X represents an original value of the output value, Y is a linear transformed output value, a and b are two fixed parameters.

13. The device according to claim 9, wherein, performing the calculation by employing the parameter of the acoustic model and the input value of the hidden layer to obtain the output value, comprises:
performing bit manipulation according to the parameter of the acoustic model and the input value of the hidden layer, to obtain the output value.

14. The device according to claim 9, wherein, performing the binarization on the output value to obtain the binarized output value comprises:
when the output value is greater than 0, determining the binarized output value as a first binarization value; and
when the output value is not greater than 0, determining binarized output value as a second binarization value different from the first value.

15. A non-transitory computer readable storage medium, wherein, when instructions in the storage medium are executed by a processor, the processor is configured to execute:
- performing acoustic characteristic extraction on an input speech, to obtain an acoustic characteristic;
- obtaining an acoustic model, wherein a parameter of the acoustic model is a binarization parameter; and
- performing speech recognition according to the acoustic characteristic and the acoustic model;

wherein, performing the speech recognition according to the acoustic characteristic and the acoustic model, comprises:

performing binarization on the acoustic characteristic;
taking the binarized acoustic characteristic as an input layer of a deep neural network when the acoustic model comprises the deep neural network; and
for each hidden layer of the deep neural network, performing calculation by employing the parameter of the acoustic model and an input value of the hidden layer to obtain an output value, and when a next hidden layer exists, performing binarization on the output value to obtain a binarized output value and taking the binarized output value as an input value of the next hidden layer.

16. The non-transitory computer readable storage medium according to claim 15, wherein the processor is further configured to perform an act of:
- generating the acoustic model by a training process, wherein the training process comprises calculating an error by using an error back propagation method, and an error precision of the error is a floating point precision.

17. The non-transitory computer readable storage medium according to claim 16, wherein the processor is further configured to perform acts of:
- performing linear transformation on the output value to obtain a transformed output value and performing binarization on the transformed output value.

* * * * *